US007311602B2

(12) United States Patent
Inoue

(10) Patent No.: US 7,311,602 B2
(45) Date of Patent: Dec. 25, 2007

(54) SYMBOL-DISPLAYING DEVICE FOR A GAME MACHINE

(75) Inventor: Haruo Inoue, Tokyo (JP)

(73) Assignee: Dragon Co., Ltd., Tokyo (JP)

( * ) Notice: Subject to any disclaimer, the term of this patent is extended or adjusted under 35 U.S.C. 154(b) by 790 days.

(21) Appl. No.: 10/732,347

(22) Filed: Dec. 11, 2003

(65) Prior Publication Data

US 2005/0043083 A1 Feb. 24, 2005

(30) Foreign Application Priority Data

Aug. 22, 2003 (JP) ............................ 2003-298228

(51) Int. Cl.
*A63F 13/00* (2006.01)

(52) U.S. Cl. .................................... 463/20; 273/143 R

(58) Field of Classification Search ............ 273/143 R, 273/138.1; 463/20-22, 30
See application file for complete search history.

(56) References Cited

U.S. PATENT DOCUMENTS 5,152,529 A * 10/1992 Okada ......................... 463/20
5,395,111 A * 3/1995 Inoue ..................... 273/143 R
5,752,881 A * 5/1998 Inoue .......................... 463/20
6,726,204 B2 * 4/2004 Inoue ..................... 273/143 R

FOREIGN PATENT DOCUMENTS

JP 4-114676 4/1992

* cited by examiner

*Primary Examiner*—Robert E. Pezzuto
*Assistant Examiner*—Alex F. R. P. Rada, II
(74) *Attorney, Agent, or Firm*—Young & Thompson

(57) ABSTRACT

An inner reel is provided with an A-zone, a B-zone and a C-zone. Symbols of the inner reel are arranged in the respective zones. The A-zone to the C-zone are selectively displayed in accordance with a game condition. The A-zone is used in a normal game. The B-zone and the C-zone are used for deciding a sort of benefit to be afforded in a free game. Either of the B-zone or the C-zone is used in the free game. Using the B-zone brings the benefits in that winning provability is raised and in that odds are increased in case of winning. Using the C-zone brings the benefit in that a number of the free games are added.

20 Claims, 16 Drawing Sheets

SYMBOL-DISPLAYING DEVICE FOR A GAME MACHINE

BACKGROUND OF THE INVENTION

1. Field of the Invention

The present invention relates to a symbol-displaying device used for a game machine of a slot machine, a Japanese upright pinball machine and so forth.

2. Description of the Related Art

A symbol-displaying device employing plural reels is incorporated into slot machines and many of Japanese upright pinball machines. Plural kinds of symbols are arranged on peripheries of the respective reels, which are rotated behind a display window. If a predetermined symbol combination is obtained at the time of reel stoppage, winning occurs. Upon occurrence of the winning, the slot machine pays out a predetermined number of coins. With respect to the Japanese upright pinball machine, a game benefit is awarded upon occurrence of the winning.

The symbol-displaying device is variously contrived so as to raise an interest of a player. As a part of contrivance, there is a symbol-displaying device having a double structure in which a reel assembly comprises an inner reel and an outer reel (see Japanese Patent Laid-Open Publication No. 04-114676, which is counterpart of Japanese Patent Publication No. 2529452, for instance). Owing to this double structure, it is possible that symbols of the outer reel and the inner reel are composed to be displayed through the display window as a single symbol. Thus, sorts of the symbols and sorts of the winnings may increase to effectively give a player an expectation feeling for the winning.

In an apparatus described in the above-noted Publication, however, whereas it is possible to increase the sorts of symbols to be displayed by combining the inner reel and the outer reel, there arises a problem in that appeal for the player lacks in spite of using the unique reel, namely the double reel. Moreover, there arises another problem in that an interest lacks in spite of using the unique reel, since game features do not change in comparison with conventional features.

SUMMARY OF THE INVENTION

In view of the foregoing, it is a primary object of the present invention to provide a symbol-displaying device for a game machine in which plural zones are provided on a peripheral surface of either of an inner reel or an outer reel so as to be selectively displayed in accordance with a game condition.

In order to achieve the above and other objects, the symbol-displaying device according to the present invention comprises at least one reel assembly having a double-reel structure including an inner reel and a transparent outer reel. The outer reel may be partially transparent. Symbols of the inner reel and the outer reel overlap to form a composite symbol, which is displayed when the inner reel and the outer reel have stopped. At least one of the inner reel and the outer reel has a peripheral surface partitioned into plural zones in which the predetermined symbols are arranged respectively. After rotating the reels, the reel having the partitioned peripheral surface is stopped so as to display one of the zones, namely the specific zone corresponding to a game condition.

In the symbol-displaying device of a preferred embodiment, a number of the reel assemblies is three. These reel assemblies are rotated behind a display window. Plural kinds of symbols are arranged on peripheral surfaces of the respective reels. When the reels have stopped, winning occurs in accordance with a combination of the symbols and the composite symbols shown in the display window.

According to the symbol-displaying device of the present invention, the zones provided on the peripheral surface of the reel are selectively displayed in accordance with the game condition. Owing to this, the game has the variety so that it is possible to raise an interest of a player.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
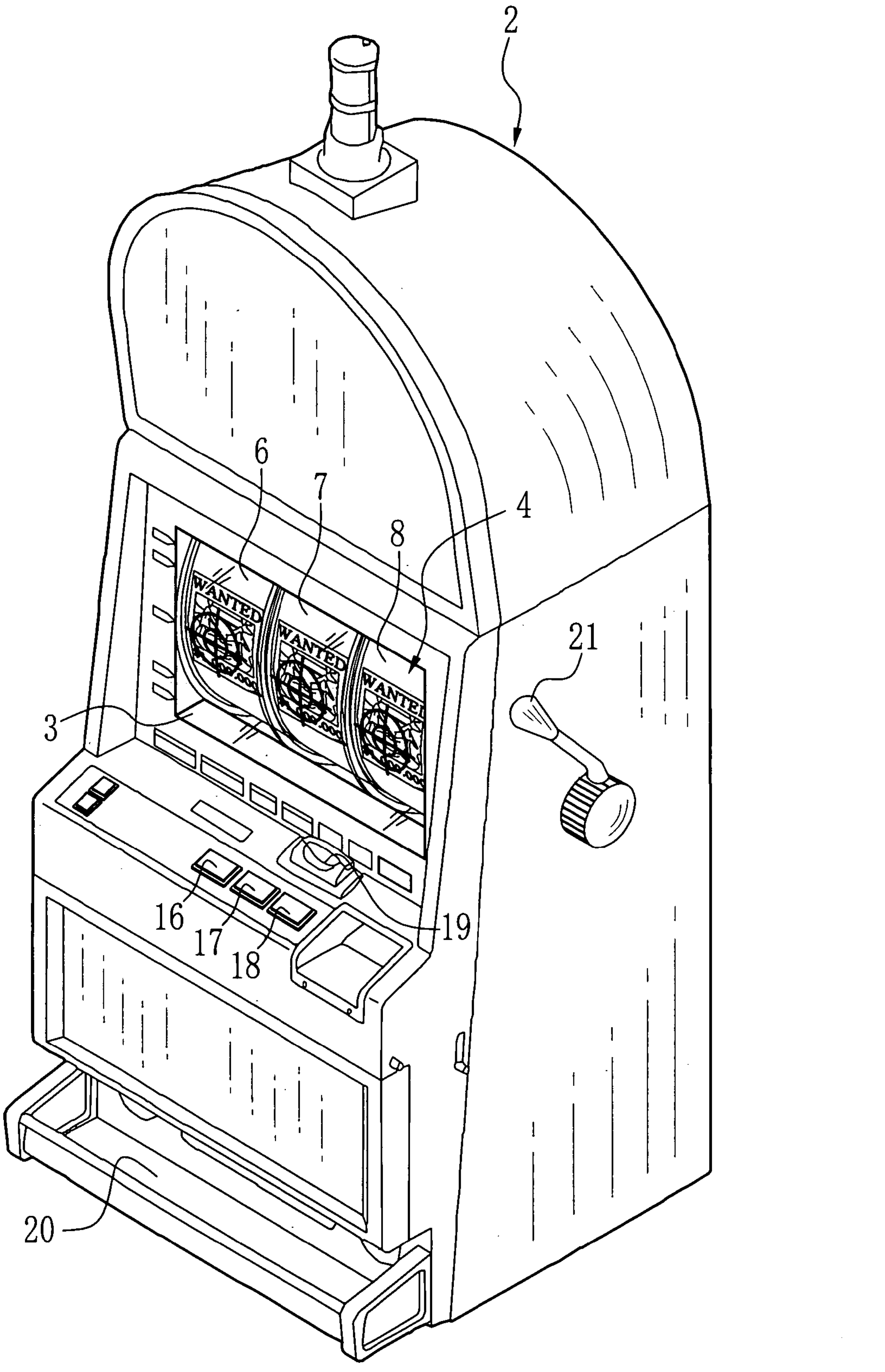
FIG. 1 is a perspective view of a slot machine.

FIG. 1 shows a perspective view of a slot machine including a symbol-displaying device according to the present invention. The front of the slot machine 2 is provided with a display window 3 formed at the center thereof. A first reel assembly 6, a second reel assembly 7 and a third reel assembly 8 constituting the symbol-displaying device 4 are adapted to be observed through the display window 3. Under the display window 3, are provided a 1-bet button 16, a MAXIMUM-bet button 17, a paying-out button 18 and a coin slot 19.

Figure 2:
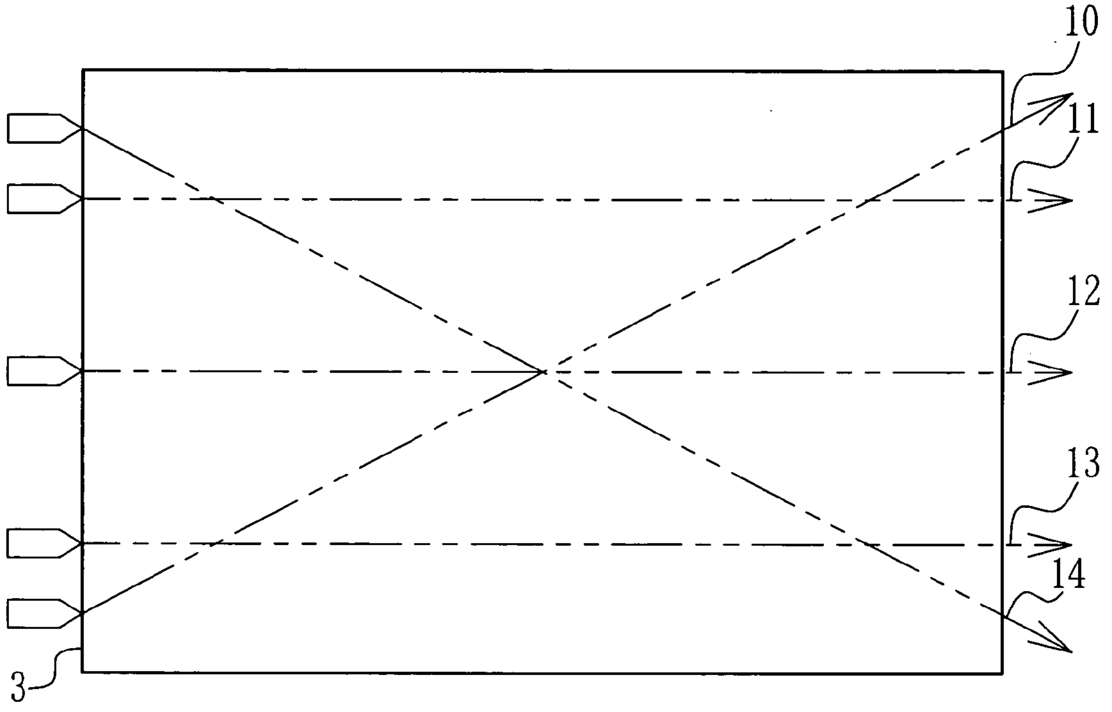
FIG. 2 is an explanatory illustration showing game lines.

As shown in FIG. 2, the display window 3 is provided with five game lines 10 to 14 including lateral three lines and diagonal two lines. After inserting coins into the coin slot 19, coin bet is performed by pressing the 1-bet button 16 or the MAXIMUM-bet buttons 17. The game lines 10 to 14 are nominated in accordance with a number of the inserted coins. By the way, coin insertion includes a meaning that coins accumulated in a credit counter, which is not shown, are betted with the 1-bet button 16 and the MAXIMUM-bet button 17, instead of actually inserting the coins into the coin slot 19. The coin defined in this specification includes a medal and a token.

The side of the slot machine 2 is provided with a start lever 21. Upon operating the start lever 21 after the coin bet., the first to third reel assemblies 6 to 8 start to rotate. And then, the first to third reel assemblies 6 to 8 are stopped after a predetermined period. When all of the reel assemblies are stopped, a symbol combination is shown in the display window 3. In accordance with the symbol combination, it is determined whether winning occurs or not relative to the current game. In case of winning, coins whose dividend number is predetermined in accordance with a kind of the winning is paid out to a tray 20.

Figure 3:
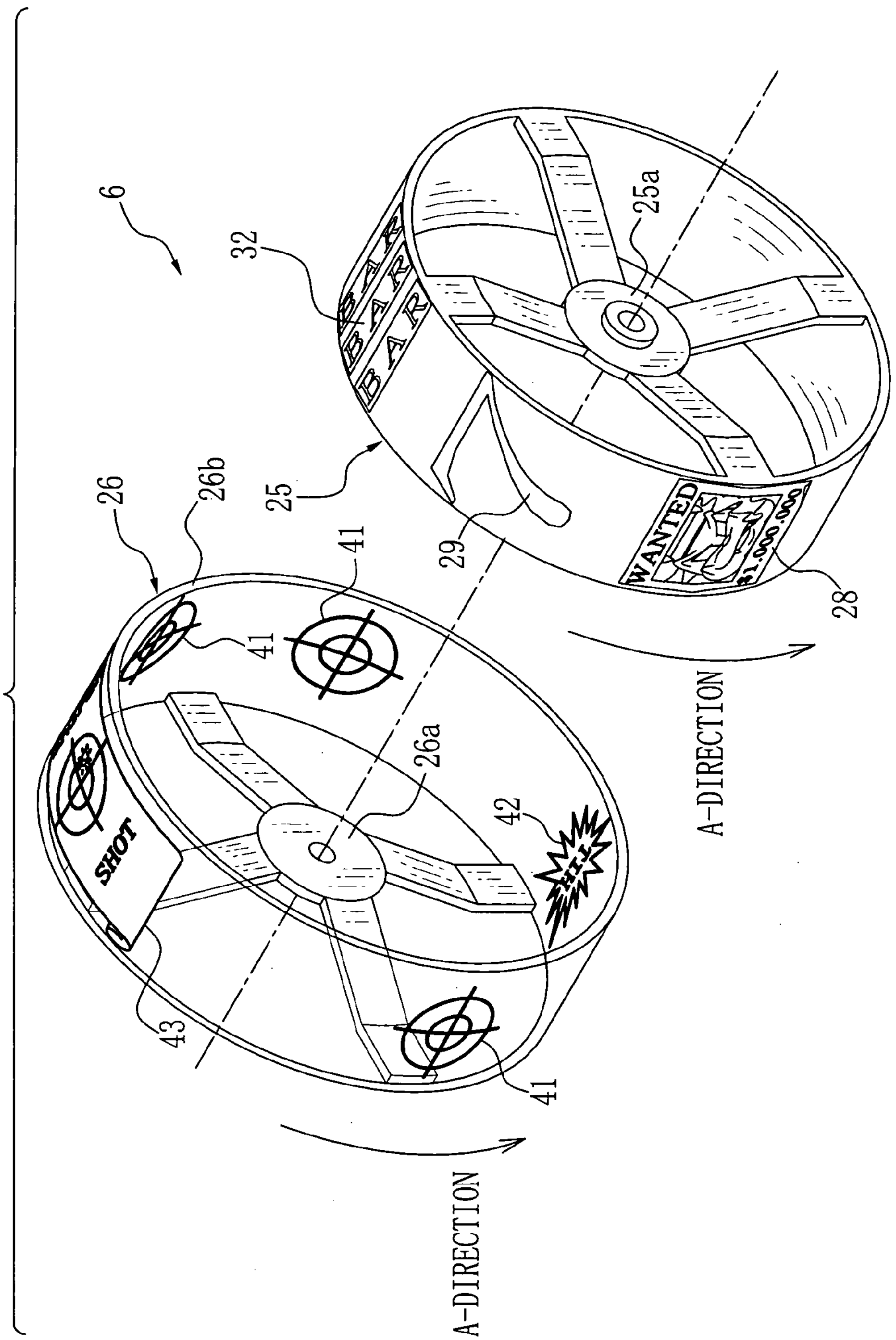
FIG. 3 is a perspective view of an inner reel and an outer reel.
Figure 4A:
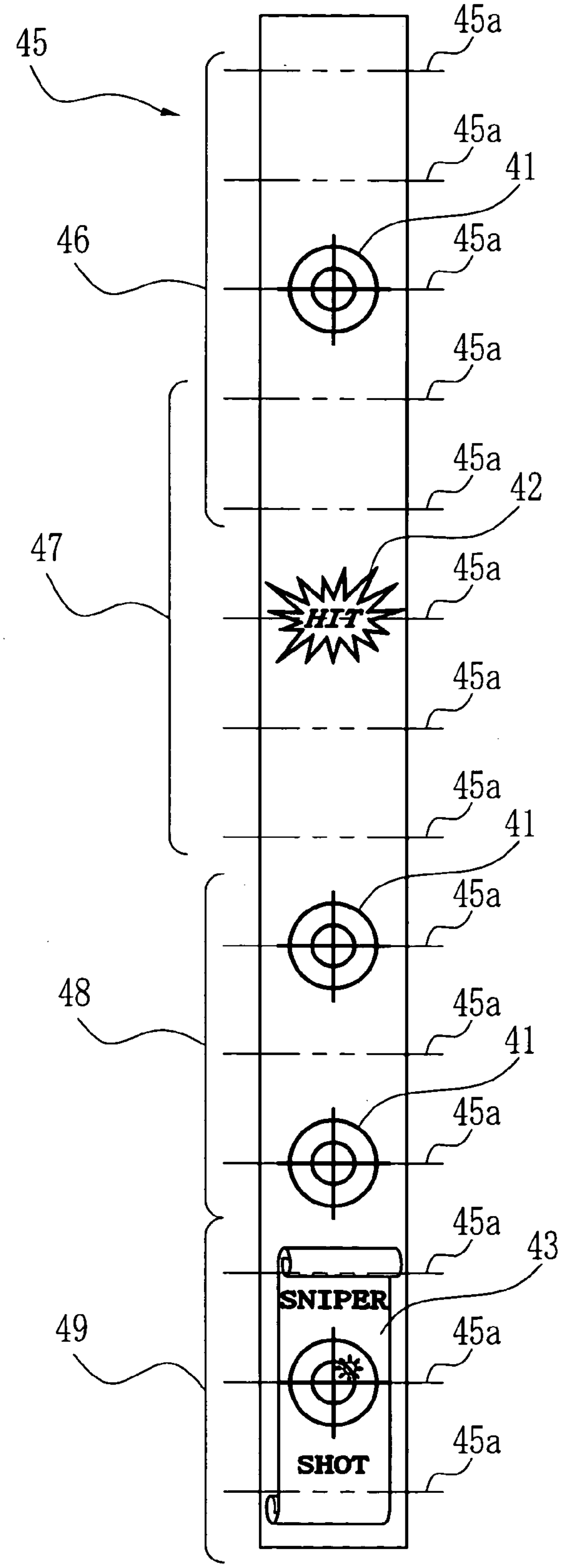
FIGS. 4A and 4B are developments of symbol sheets.
Figure 4B:
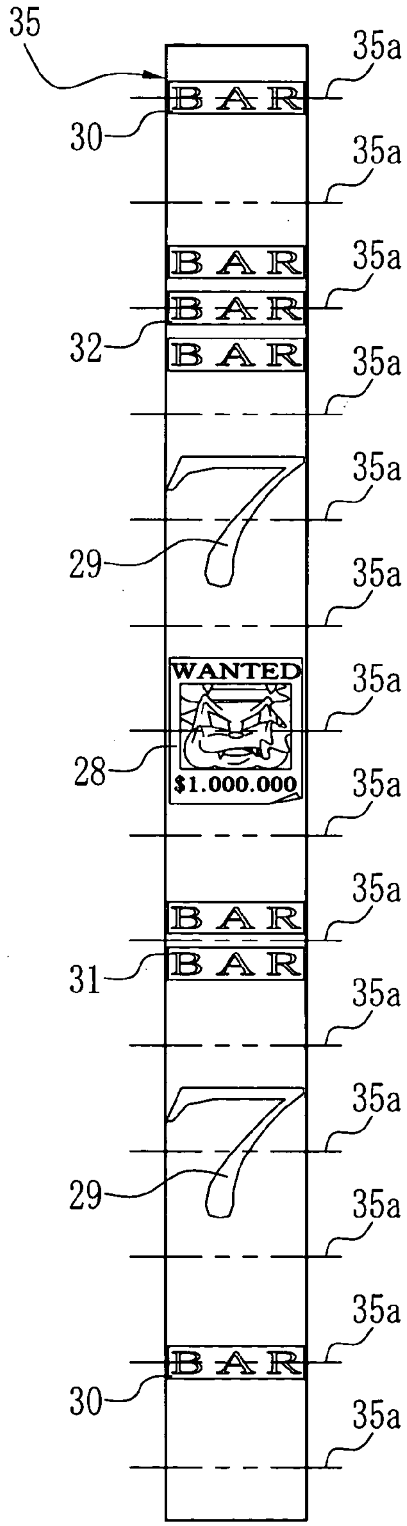

Such as shown in FIGS. 3 and 4, the first to third reel assemblies 6 to 8 respectively have a double-reel structure comprising an inner reel 25 and an outer reel 26. Since the first to third reel assemblies 6 to 8 respectively have the identical structure, the first reel assembly 6 is described below as a representative.

The inner reel 25 is formed from a plastic material having permanence, and the whole periphery thereof is white and opaque. A symbol sheet 35 on which a “WANTED” symbol 28, “7” symbols 29, “BAR” symbols 30, a “2BAR” symbol 31 and a “3BAR” symbol 32 are printed is wound around a peripheral surface of the inner reel 25.

The symbol sheet 35 is provided with fourteen reference lines 35*a* extending in a width direction. The reference lines 35*a* are provided such that an interval of the reference lines 35*a* is identical to an interval of the lateral game lines 11 to 13 when observed through the display window 3. Each symbol is arranged at the reference lines 35*a*. A portion where the symbol is not arranged at the reference line is a blank portion. With respect to the inner reel 25, the symbol and the blank portion are alternately provided.

Upon starting the game, the inner reel 25 starts to rotate in a direction (shown by an arrow A in FIG. 3, hereinafter called as forward direction) that the respective symbols flow downward in the display window 3. Then, the inner reel 25 stops at a position where the game lines 11 to 13 overlap with the reference lines 35*a*. Since the respective symbols are arranged so as to interpose the blank portion, a number of the symbols shown in the display window 3 is three or more and is six or less upon stopping the inner reels 25 of the first to third reel assemblies 6 to 8.

Meanwhile, a reel body 26*b*, which is the periphery of the outer reel 26, is formed from a transparent plastic. Around this periphery, is wound a transparent symbol sheet 45 on which target symbols 41, a “HIT” symbol 42 and a “SNIPER SHOT” symbol 43 are printed. In virtue of this, the symbol of the inner reel 25 can be observed through the symbol of the outer reel 26. Incidentally, it is preferable that the respective symbols of the outer reel 26 are printed by using a paint and so forth having a fluorescent property so as to easily watch the overlapping symbol of the inner reel 25.

A symbol sheet 45 is provided with fourteen reference lines 45*a*, similarly to the symbol sheet 35. The respective symbols of the outer reel 26 are arranged at the reference lines 45*a*, and a portion where the symbol is not arranged at the reference line 45*a* is a blank portion. Further, an arrangement interval of the reference lines 45*a* is adjusted so as to correspond to an arrangement interval of the game lines 11 to 13. Upon starting the game, the outer reel 26 starts to rotate in a predetermined pattern. And then, the outer reel 26 stops at a position where the game lines 11 to 13 overlaps with the reference lines 45*a*.

Figure 5:
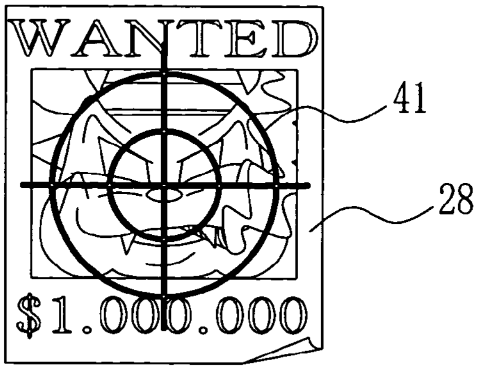
FIG. 5 is an explanatory illustration showing a composite symbol.

The target symbol 41 is a winning symbol. Such as shown in FIG. 5, the target symbol 41 forms a composite symbol when displayed over the symbol of the inner reel 25. This composite symbol is participant in a winning. Although FIG. 5 shows an example in that the “WANTED” symbol 28 and the target symbol 41 overlap, five kinds of composite symbols are formed by overlapping the target symbol 41 with the respective symbols of the inner reel 25, since the five kinds of the symbols are arranged on the inner reel 25 in total.

Figure 6:
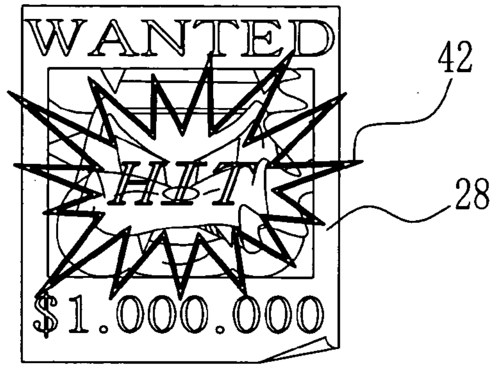
FIG. 6 is an explanatory illustration showing a state in that a symbol "HIT" decorates another symbol.
Figure 7:
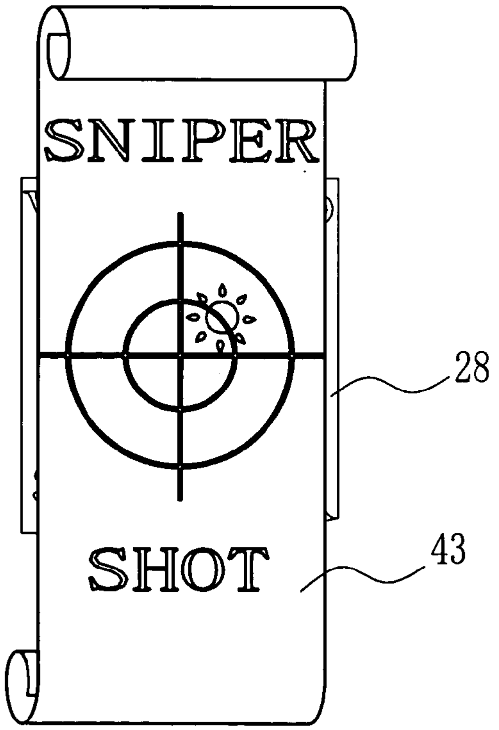
FIG. 7 is an explanatory illustration showing a state in that a symbol "SNIPER SHOT" covers another symbol.

The “HIT” symbol 42 is a decorative symbol. Such as shown in FIG. 6, the symbol of the inner reel 25 is decorated for attraction by displaying the “HIT” symbol 42 over the symbol of the inner reel 25. Meanwhile, the “SNIPER SHOT” symbol 43 is a mask symbol printed by using a paint and so forth having an opaque property. Such as shown in FIG. 7, the symbol of the inner reel 25 is blocked by displaying the mask symbol over the symbol of the inner reel 25 so that a player can hardly recognize a state of the inner reel 25.

Moreover, the symbol sheet 45 is partitioned into four zones of an A-zone 46, a B-zone 47, a C-zone 48 and a D-zone 49. The A to D zones 46 to 49 are shifted to be displayed in accordance with a game condition.

The A-zone 46 includes the target symbol 41 and the blank portions provided at both sides of the target symbol 41 in a vertical direction. Each of these blank portions corresponds to two reference lines 45*a*. The A-zone 46 is used for a normal game and a special game described later. By the way, the target symbol 41 of the A-zone 46 is adapted to be displayed at the center of the display window 3 before and after the game (see FIG. 1).

The B-zone 47 includes the “HIT” symbol 42 and the blank portions provided at both sides of the “HIT” symbol 42 in the vertical direction. Each of these blank portions corresponds to two reference lines 45*a*. The B-zone 47 is used when the winning has occurred. Incidentally, the A-zone 46 and the B-zone 47 share the blank portion formed between the target symbol 41 and the “HIT” symbol 42.

The C-zone 48 and the D-zone 49 are used for the special game to be caused at a constant probability during the normal game. The C-zone 48 includes the blank portion, which corresponds to the sole reference line 45*a*, and the target symbols 41 arranged above and under this blank potion. The D-zone 49 includes the “SNIPER SHOT” symbol 43 formed in a size extending across the three reference lines 45*a*.

The inner reel 25 and the outer reel 26 are integrally formed with hubs 25*a* and 26*a* respectively, via which stepping motors are directly connected. The inner reel 25 and the outer reel 26 are rotated in association with rotation of the stepping motors.

Figure 8:
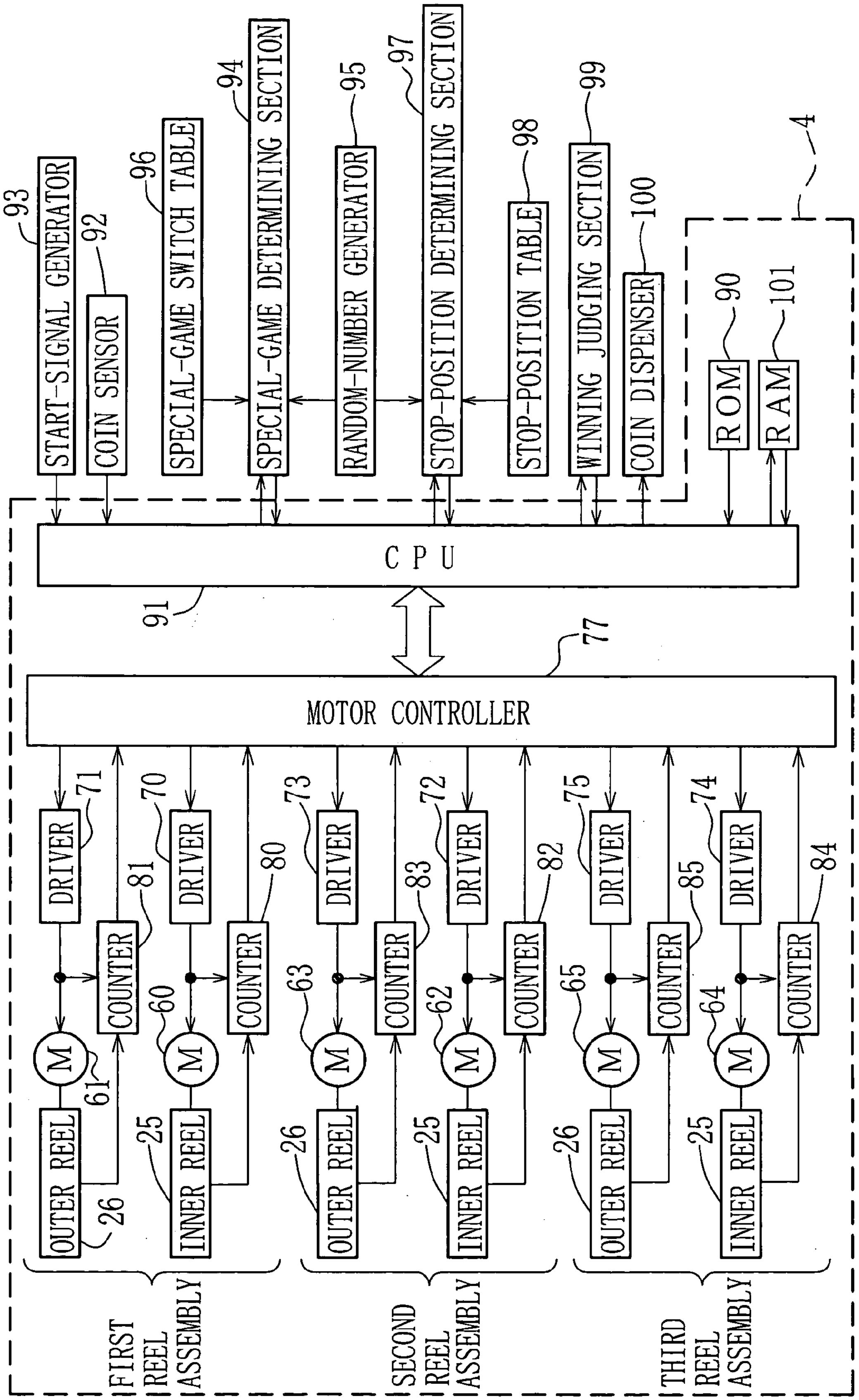
FIG. 8 is a block diagram showing an electrical structure of the slot machine.

FIG. 8 is a block diagram schematically showing an electrical structure of the slot machine 2. The stepping motors 60 to 65 for rotating the inner reels 25 and the outer reels 26 of the first to third reel assemblies 6 to 8 are connected to a motor controller 77 via drivers 70 to 75. The stepping motors 60 to 65 are driven by the motor controller 77 supplying drive pulses thereto via the drivers 70 to 75. Each of the stepping motors 60 to 65 rotates unit-step angle by unit-step angle in accordance with a number of the drive pulses inputted from the respective drivers 70 to 75. The inner reels 25 and the outer reels 26 are rotated in association with the rotation of the stepping motors 60 to 65.

Counters 80 to 85 count the numbers of the drive pulses to be inputted from the drivers 70 through 75 to the stepping motors 60 through 65. The inner reels 25 and the outer reels 26 are respectively provided with a signal segment for representing a reference position. Rotation of the signal segment is monitored by a photointerruptor. Whenever the inner reel 25 and the outer reel 26 make one rotation, a reset signal is obtained from the photointerruptor to reset a count value of the respective counters 80 through 85 to zero. Thus, the count value of the respective counters 80 through 85 represents a rotational position within one rotation of the reel.

The rotational positions of the inner reel 25 and the outer reel 26, which are identified when the reset signal is obtained, are known in advance. Further, the kinds and the orders of the symbols arranged on the inner reel 25 and the outer reel 26 are also known in advance. A ROM 90 stores a data table in which the kinds of the symbols arranged on the inner reel 25 and the outer reel 26 are related to step numbers to be taken from the reference position to the reference lines 35*a* and 45*a* at which the symbols are arranged. Moreover, the data table memorizes a rotational relationship between the reference position and the display window 3. It is possible to control a position of the symbol to be shown in the display window 3, by adjusting the number of the drive pulses to be supplied to the stepping motors 60 to 65. This number of the drive pulses is adjusted, referring to the counters 80 to 85.

A CPU 91 is connected to each section of the slot machine 2 to control the respective sections. The CPU 91 runs on the basis of a control program stored in the ROM 90. The motor controller 77 is controlled by the CPU 91 so that rotating and stopping of the inner reel 25 and the outer reel 26 are determined by the CPU 91. Further, rotational patterns and stop positions of the inner reel 25 and the outer reel 26 are also determined by the CPU 91.

A coin sensor 92 is disposed behind the coin slot 19 to input a coin detection signal into the CPU 91 upon detecting insertion of an appropriate coin. Whenever the coin detection signal is inputted, the CPU 91 nominates the respective game lines 10 to 14 in a predetermined order as a valid line. The nominated game line is temporally saved in a PAM 101. When the start lever 21 is operated after inserting the coin, a start-signal generator 93 is turned on and a game start signal is outputted from the CPU 91 to a special-game determining section 94.

Upon receiving the game start signal from the CPU 91, the special-game determining section 94 activates a random-number generator 95 to do sampling of a random number. On the basis of the sampled random number and a special-game switch table 96, the special-game determining section 94 judges whether a special game is played or not. As a result of the judgment, in a case of playing the special game, a special-game start signal is sent to the CPU 91 and a stop-position determining section 97. In contrast, when the special game is judged not to be played, a normal-game start signal is sent to the CPU 91 and the stop-position determining section 97.

Upon receiving the normal-game start signal, the stop-position determining section 97 activates the random-number generator 95 to do sampling of a random number. Successively, on the basis of the sampled random number and a stop-position table 98, the stop-position determining section 97 determines stop positions of the inner reels 25 and the outer reels 26. Further, the stop-position determining section 97 temporally stores the determined stop positions in the RAM 101.

Meanwhile, the CPU 91 drives the motor controller 77 upon receipt of the normal-game start signal to rotate the inner reels 25 in the forward direction. Moreover, the CPU 91 rotates the outer reels 26 in the forward direction referring to the count values of the counters 81, 83 and 85 until the target symbol 41 of the A-zone 46 is displayed at the lower game line 13 of the display window 3. After that, the CPU 91 reverses the rotational direction of the outer reel 26 to rotate the outer reel 26 backward until the target symbol 41 is displayed at the upper game line 11 of the display window 3. The CPU 91 repeats the forward rotation and the backward rotation of the outer reel 26 (see FIG. 10).

After a predetermined period has passed, the CPU 91 rotates the respective reels to the stop positions stored in the RAM 101, referring to the count values of the counters 80 to 85 and the data table stored in the ROM 90. Then, the CPU 91 outputs a reel-stop signal to the motor controller 77 to stop the respective reels. In the reel assembly, the inner reel 25 is stopped first and the outer reel 26 is stopped after a predetermined period has passed from the stoppage of the inner reel 25.

In the meantime, the stop-position determining section 97 determines only the stop positions of the inner reels 25 when receiving the special-game start signal. The stop-position determining section 97 does sampling of the random number by using the random-number generator 95 to determine the stop positions of the inner reels 25 on the basis of the sampled random number and the stop-position table 98. The determined stop positions are temporally stored in the RAM 101.

Figure 13:
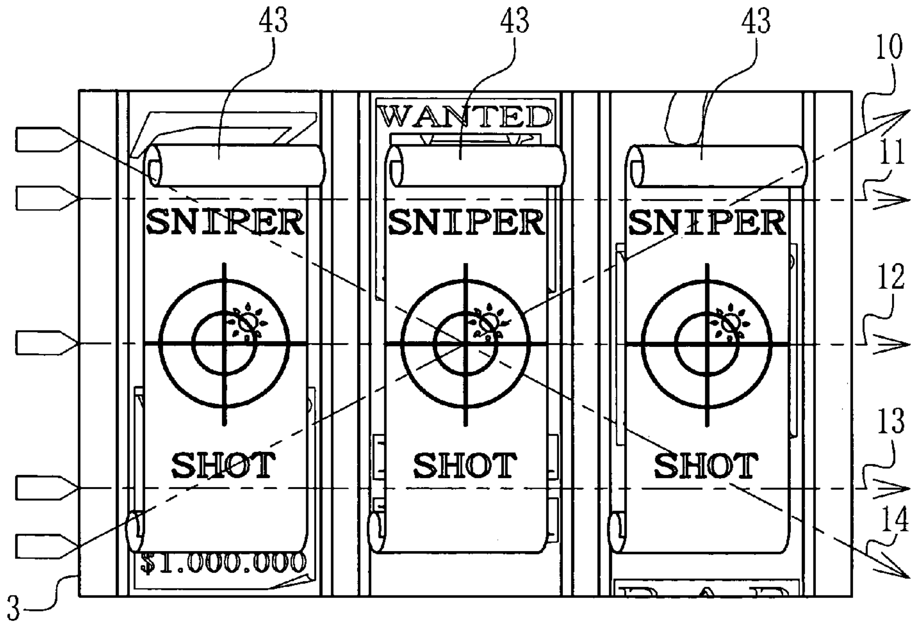
FIG. 13 is an explanatory illustration showing a commencement state of an extra game.

The CPU 91 rotates the outer reels 26 upon receipt of the special-game start signal and stops them so as to display the "SNIPER SHOT" symbols 43 at the center of the display window 3, referring to the count values of the counters 81, 83 and 85 (see FIG. 13). Successively, the CPU 91 rotates the inner reels 25 in the forward direction. And then, the CPU 91 outputs the reel-stop signal to the motor controller 77 after a predetermined period to stop the inner reels 25 at the respective stop positions stored in the RAM 101.

After that, the CPU 91 refers to the count values of the counters 80, 82 and 84 to check the stop positions of the inner reels 25. Then, the CPU 91 determines the stop positions of the outer reels 26 so as to display the target symbols 41 over all of the symbols shown by the stopped inner reels 25 (see FIG. 14). In other words, regarding the symbols displayed by the respective reel assemblies 6 to 8, there are two cases, in one of which two symbols are displayed on the game lines 11 and 13, and in the other of which the sole symbol is merely displayed on the game line 12. The C-zone 48 is used in the former case and the A-zone 46 is used in the latter case. After the CPU 91 has driven the motor controller 77 to rotate the outer reels 26, the CPU 91 outputs the reel-stop signal to stop the outer reels at the determined stop positions.

When the normal game and the special game have been over and all of the inner reels 25 and the outer reels 26 have stopped, a winning judging section 99 judges whether or not a displayed symbol combination is a symbol combination constituted of winning symbols and composite symbols. The ROM 90 stores data, in advance, concerning the combinations of the winning symbols and the composite symbols. The winning judgment section 99 checks the stop positions of all the reels, refereeing to the counters 80 to 85, to judge whether the winning symbol combination occurs or not.

Figure 12:
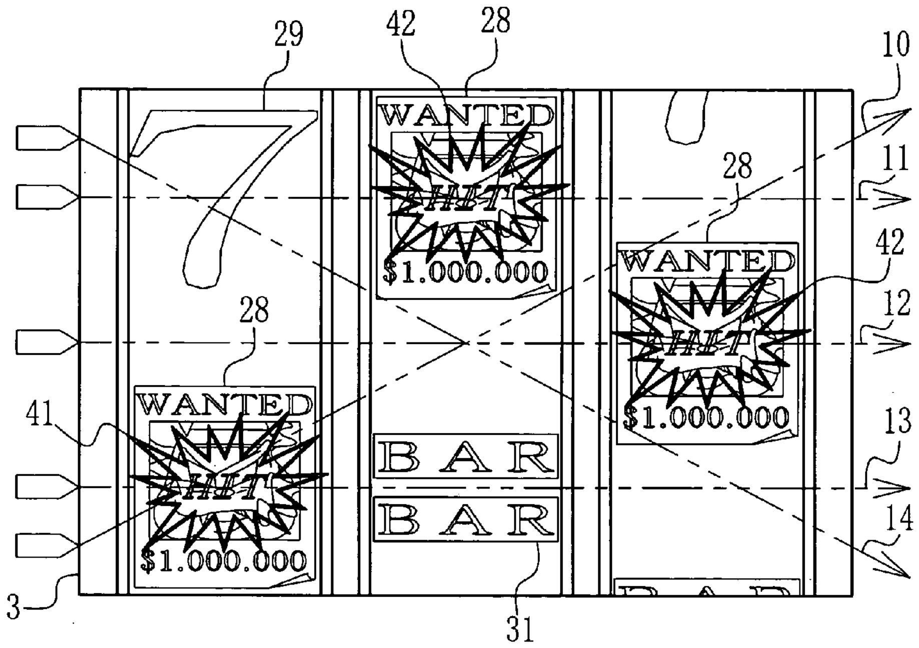
FIG. 12 is an explanatory illustration showing a state in that a winning symbol is decorated.

When the winning judgment section 99 has judged the winning, the CPU 91 rotates the outer reel 26 to the position where the "HIT" symbol 42 of the B-zone 47 overlaps with the winning symbol (see FIG. 12). Further, in this case, the CPU 91 actuates a coin dispenser 100 to pay the coins of a number corresponding to the winning. After that, the CPU 91 rotates the outer reel 26 and stops it so as to display the target symbol 41 of the A-zone 46 at the center of the display window 3 (see FIG. 1).

Figure 9:
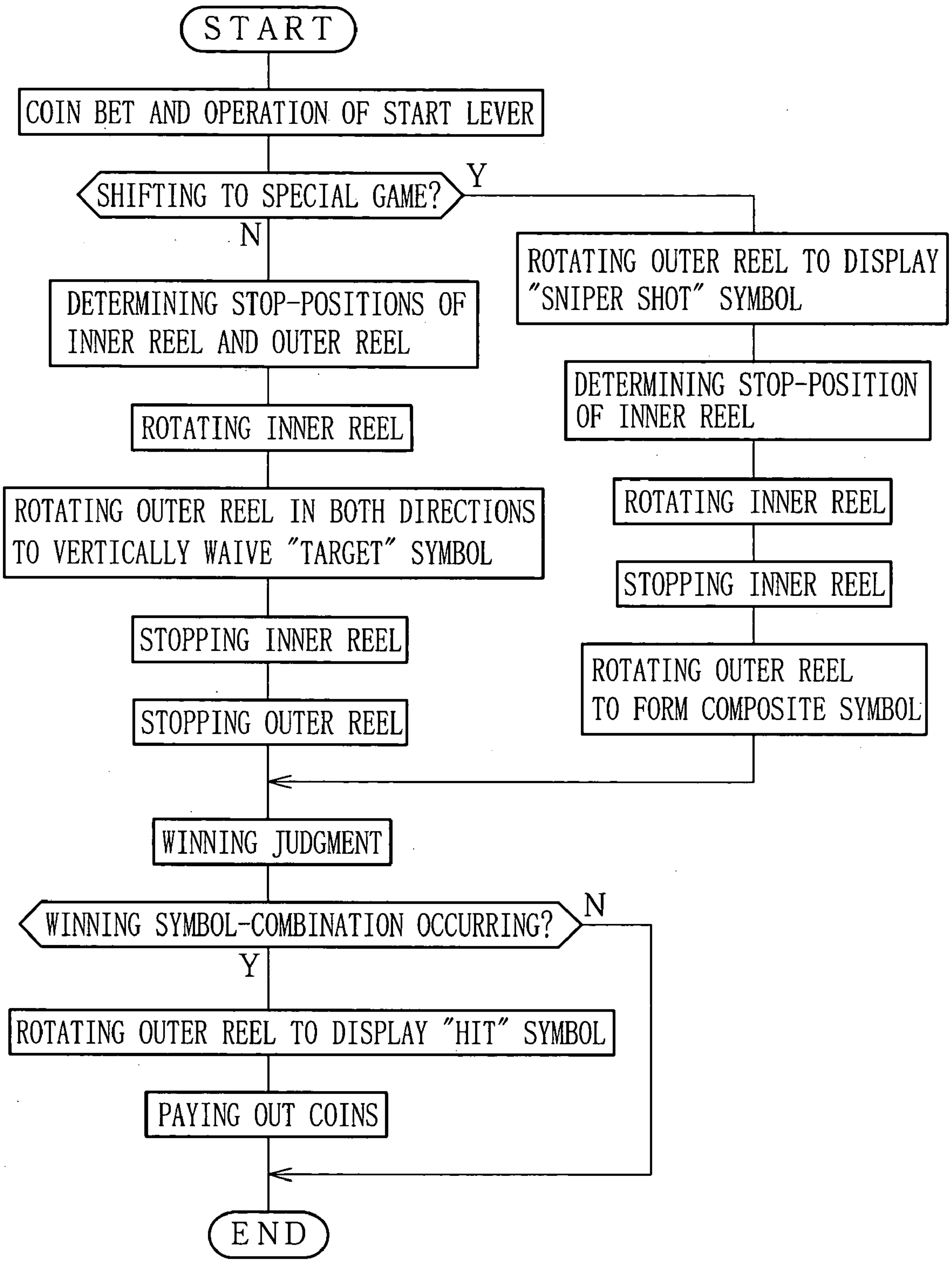
FIG. 9 is a flow chart showing a game sequence.

An operation of the above structure is described below, referring to a flowchart shown in FIG. 9. A player inserts a prescribed number of coins into the coin slot 19. Successively, the player bets the coin by depressing the 1-bet button 16 or the MAXIMUM-bet button 17. In accordance with the number of the inserted coins, the respective game lines 10 to 14 are nominated as the valid line. And then, the game is started by operating the start lever 21.

At the time of the game start, it is simultaneously judged by drawing the random number whether the special game is played or not. On the basis of this judgment, it is determined to start either of the special game or the normal game. In the following, are separately described two cases, in one of which the normal game is started and in the other of which the special game is started. Incidentally, in the following description, the game is performed in a state that all of the game lines are nominated as the valid lines.

Figure 10:
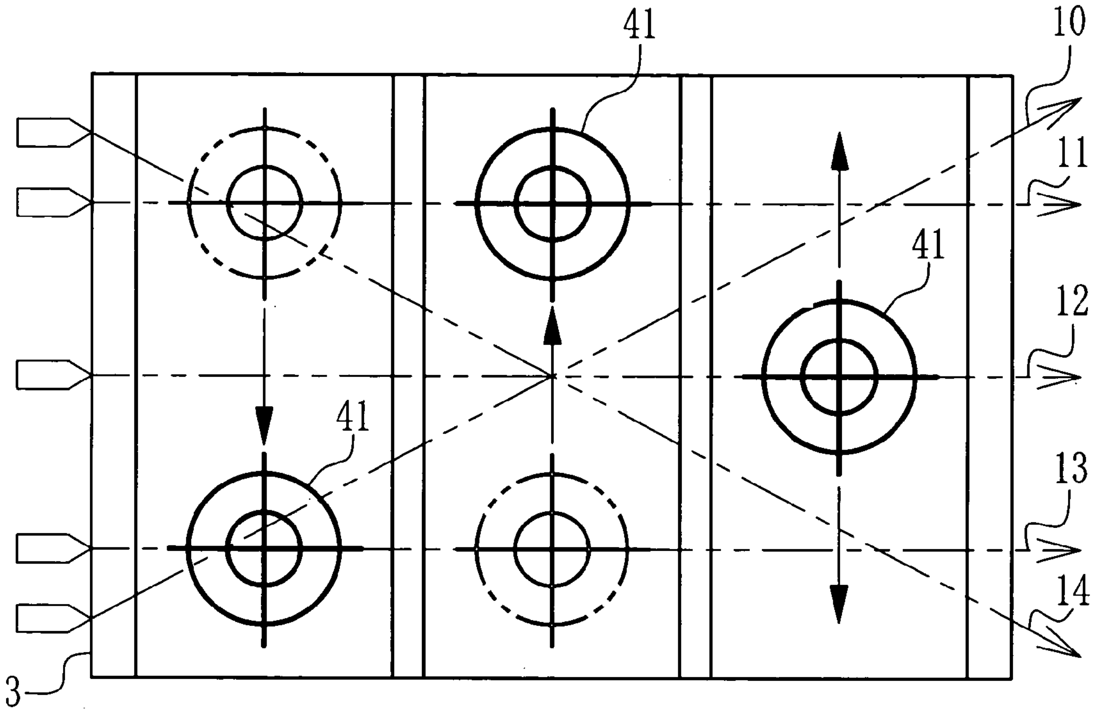
FIG. 10 is an explanatory illustration showing a movement of a symbol "target"

When the normal game is started, the stop positions of the inner reels 25 and the outer reels 26 are decided first by drawing the random number. Successively, the inner reel 25 starts to rotate in the forward direction, and at the same time, the outer reel 26 starts to rotate in the predetermined pattern. At this time, the outer reel 26 uses the A-zone 46. Such as shown in FIG. 10, the outer reel 26 rotates in the forward and backward directions so as to largely swing the target symbol 41 of the A-zone 46 between an upper portion and a lower portion of the display window 3. Afterward, the inner reel 25 is stopped on ahead, and the outer reel 26 is stopped after a predetermined period. By the way, as to the A-zone 46, the blank portions are provided at both sides of the target symbol 41 in the vertical direction. Thus, the other symbol is not observed through the display window 3 when performing the swing movement of the outer reel 26.

Figure 11:
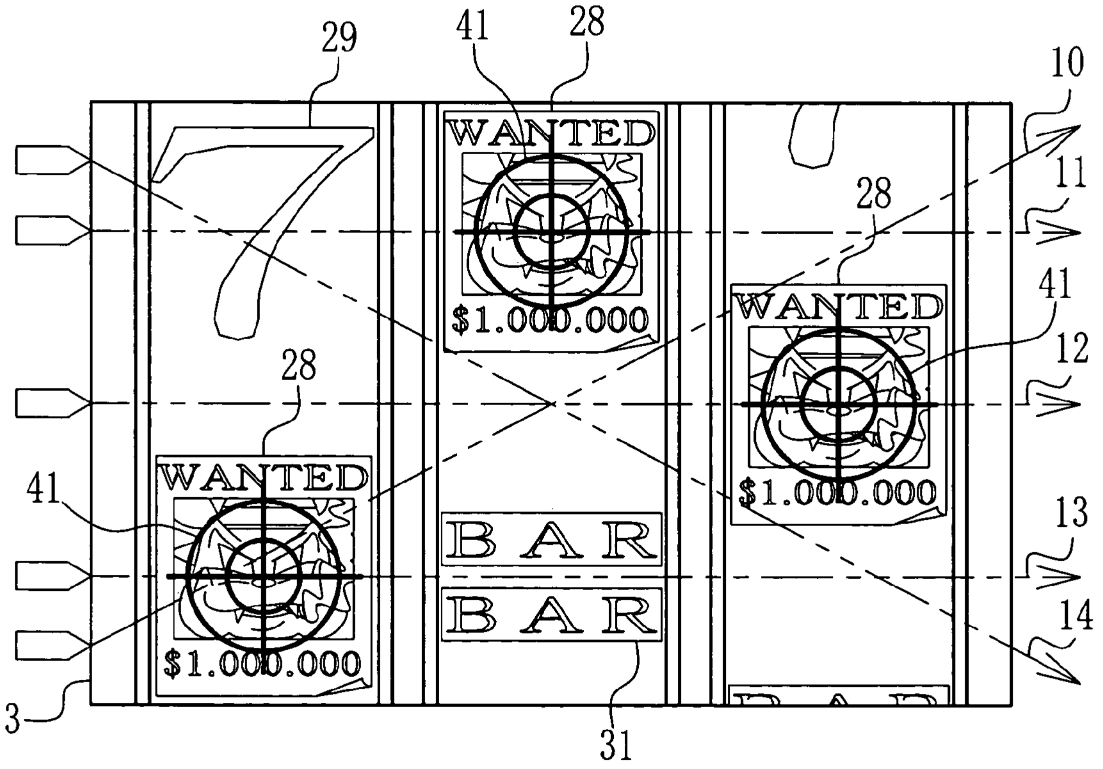
FIG. 11 is an explanatory illustration showing a state in that winning is caused by a combination of the composite symbols.

After stopping the respective reels, it is judged whether the winning occurs or not. The symbol of the inner reel 25 concerns the winning. In case the same symbols are displayed along any of the game lines 10 to 14, the winning occurs. Meanwhile, the target symbol 41 is the winning symbol so that the composite symbol, which is formed by displaying the target symbol 41 over the symbol of the inner reel, also concerns the winning. When the first to third reel assemblies 6 to 8 display the same composite symbols one by one such as shown in FIG. 11, the winning occurs without regard to the game lines.

In the case of the winning, the outer reel 26 is rotated to perform an attractive action by decorating the winning symbol. At this time, the B-zone 47 of the outer reel 26 is used. The rotating outer reel 26 is stopped so as to display the "HIT" symbol 42 of the B-zone 47 over the winning symbol, such as shown in FIG. 12. As to the "HIT" symbol 42 of the B-zone 47, both sides thereof in the vertical direction are the blank portions similarly to the A-zone 46. Thus, the other symbol is not observed when the "HIT" symbol 42 is displayed at any position of the display window 3.

After the attractive action, the coins of which dividend number is predetermined in accordance with a kind of the winning are paid to the coin tray 20. Then, the outer reel 26 is rotated and is stopped so as to display the target symbol 41 of the A-zone 46 at the center of the display window 3.

In the meantime, when the special game is started, the outer reels 26 of the first to third reel assemblies 6 to 8 are rotated to cover the symbols of the inner reels 25. At this time, the D-zone 49 of the outer reel 26 is used. The rotating outer reel 26 is stopped so as to display the "SNIPER SHOT" symbol 43 of the D-zone 49 at the center of the display window 3, such as shown in FIG. 13.

Figure 14:
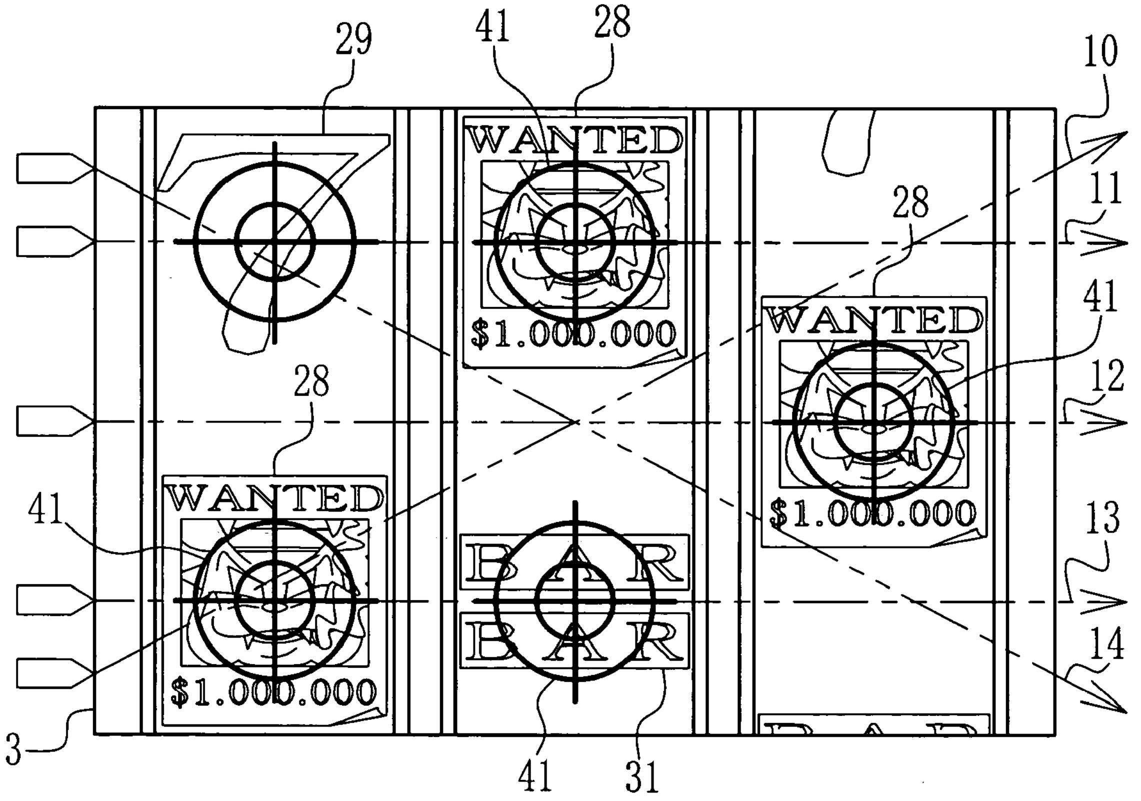
FIG. 14 is an explanatory illustration showing a closing state of the extra game.

After stopping the outer reel 26, the stop positions of the inner reels 25 are decided by drawing the random number. And then, the inner reel 25 starts to rotate in the forward direction and is stopped after the rotation of a predetermined period. When the inner reel 25 has stopped, the outer reel 26 is rotated again. At this time, the A-zone 46 and the C-zone 48 of the outer reel 26 are selectively used. The rotating outer reels 26 are stopped so as to display the target symbols 41 over all the symbols displayed by the inner reels 25, such as shown in FIG. 14.

After stopping the respective reels, occurrence of the winning is judged. Similarly to the normal game, the winning occurs when the same symbols are displayed along any of the game lines 10 to 14 and when the first to third reel assemblies 6 to 8 display the same composite symbols one by one. In the special game, all of the displayed symbols are the composite symbols so that occurrence probability of the winning is higher in comparison with the normal game.

In the case of winning, the outer reel 26 is rotated to display the "HIT" symbol 42 of the B-zone 47 over the winning symbol. Attractive action is performed by decorating the winning symbol (see FIG. 12). Afterward, the coins of which dividend number is determined relative to the winning symbol are paid to the tray 20. And then, the outer reel 26 is rotated to display the target symbol 41 of the A-zone 46 at the center of the display window 3.

In this way, the A-zone 46 to the D-zone 49 are selectively displayed in accordance with the game condition. Owing to this, the game has the variety so that it is possible to raise an interest of a player.

With respect to the symbols to be arranged on the symbol sheet, it is possible to properly change kinds, a number, an arrangement order and so forth thereof. Hereinafter, is described another embodiment in that a symbol sheet different from the forgoing embodiment is used. Incidentally, in FIG. 15 and the following, a component being identical with that of the forgoing embodiment is denoted by the same reference numeral, and description thereof is abbreviated.

Figure 15:
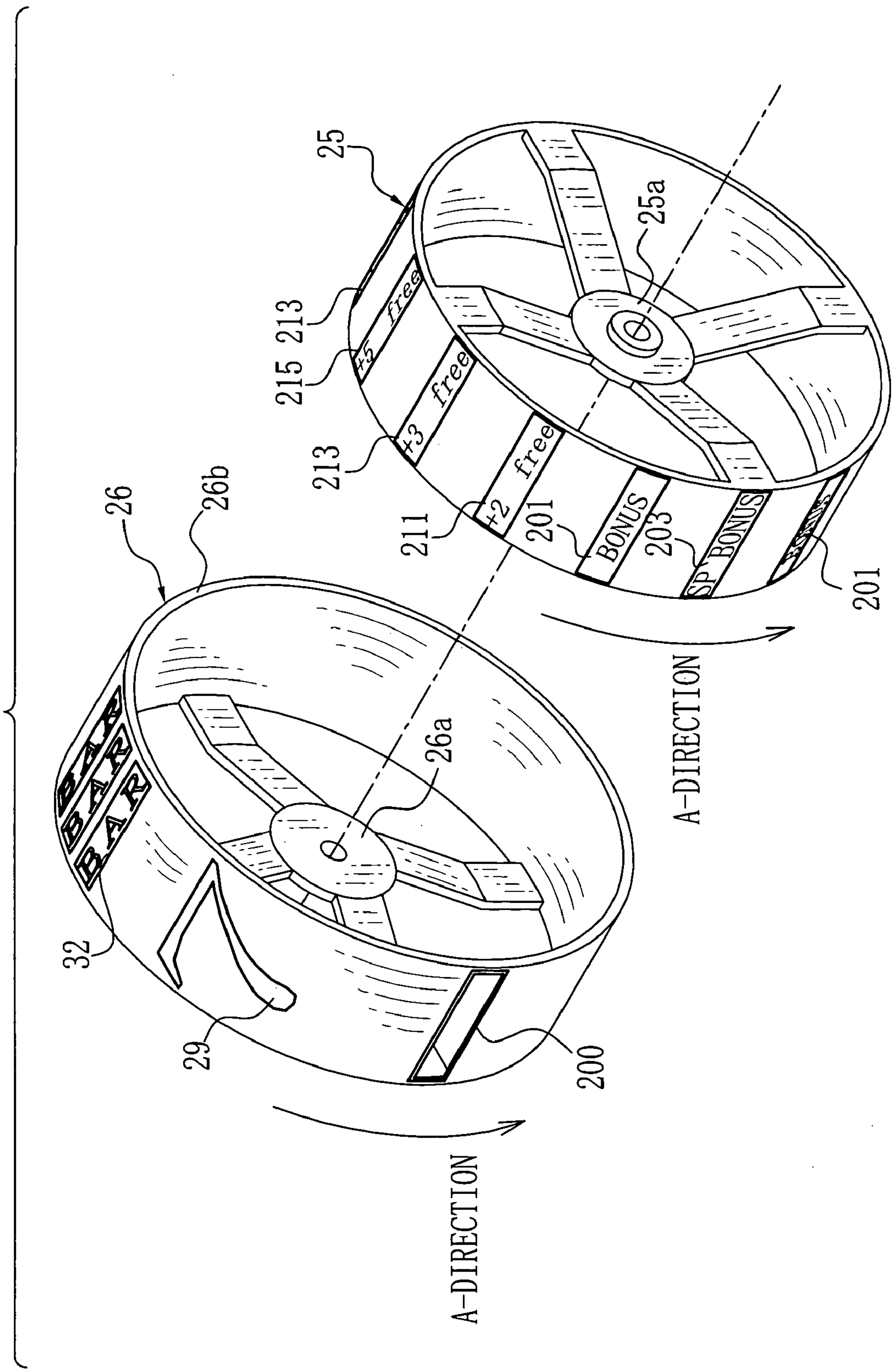
FIG. 15 is a perspective view of another inner reel and another outer reel.
Figure 16A:
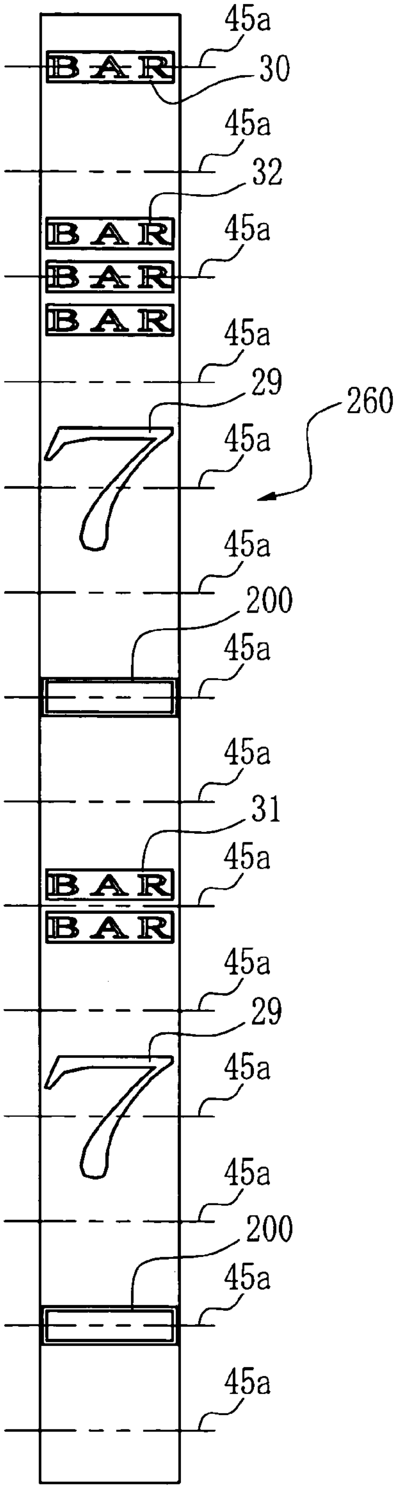
FIGS. 16A and 16B are developments of symbol sheets.
Figure 16B:
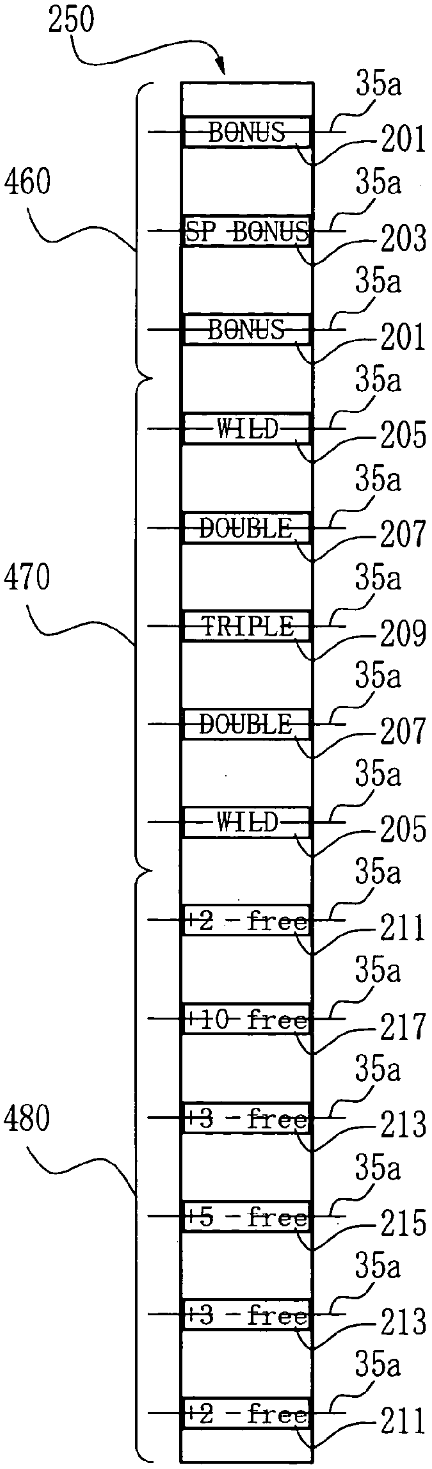

As shown in FIGS. 15 and 16, a peripheral surface of the outer reel 26 is wound with an opaque symbol sheet 260 on which the "7" symbols 29, the "BAR" symbol 30, the "2BAR" symbol 31, the "3BAR" symbol 32 and window symbols 200 are printed. When the game is commenced, the outer reel 26 starts to rotate after the stop position has been decided by drawing the random number. Then, the outer reel 26 is stopped at the decided stop position after a predetermined period.

The "7" symbol 29, the "BAR" symbol 30, the "2BAR" symbol 31 and the "3BAR" symbol 32 concern the winning. When the same symbols are displayed along the game line after stopping the first to third reel assemblies 6 to 8, the winning occurs. Meanwhile, the window symbol 200 has a rectangular frame, the inside of which is transparent, so that it is possible to observe a state of the inner reel 25 disposed behind the window symbol 200.

Figure 17:
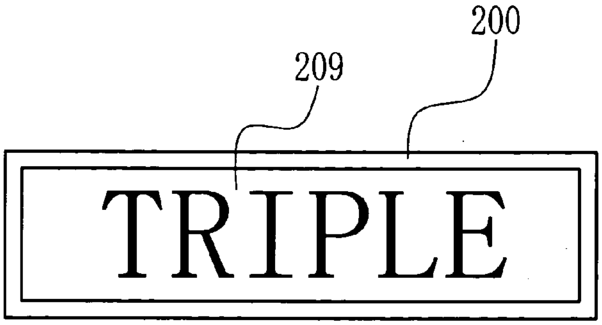
FIG. 17 is an explanatory illustration showing a composite symbol.

The peripheral surface of the inner reel 25 is wound with a symbol sheet 250 on which "BONUS" symbols 201, a "SP BONUS" symbol 203, "WILD" symbols 205, "DOUBLE" symbols 207, a "TRIPLE" symbol 209, "+2 free" symbols 211, "+3 free" symbols 213, a "+5 free" symbol 215, and a "+10 free" symbol 217 are printed. As shown in FIG. 17, a composite symbol is formed by displaying the respective symbols of the inner reel 25 inside the window symbol 200 of the outer reel 26.

Further, the symbol sheet 250 is formed with three zones of an A-zone 460, a B-zone 470 and a C-zone 480. The A-zone 460 is constituted of the "SP BONUS" symbol 203 and the "BONUS" symbols 201 arranged at both sides thereof in the vertical direction. The A-zone 460 has a size corresponding to three reference lines 35*a* and is used in the normal game. At the time of the normal game, the inner reels 25 stop in a state that the "SP BONUS" symbols 203 are aligned along the middle game line 12 of the display window 3.

Figure 18:
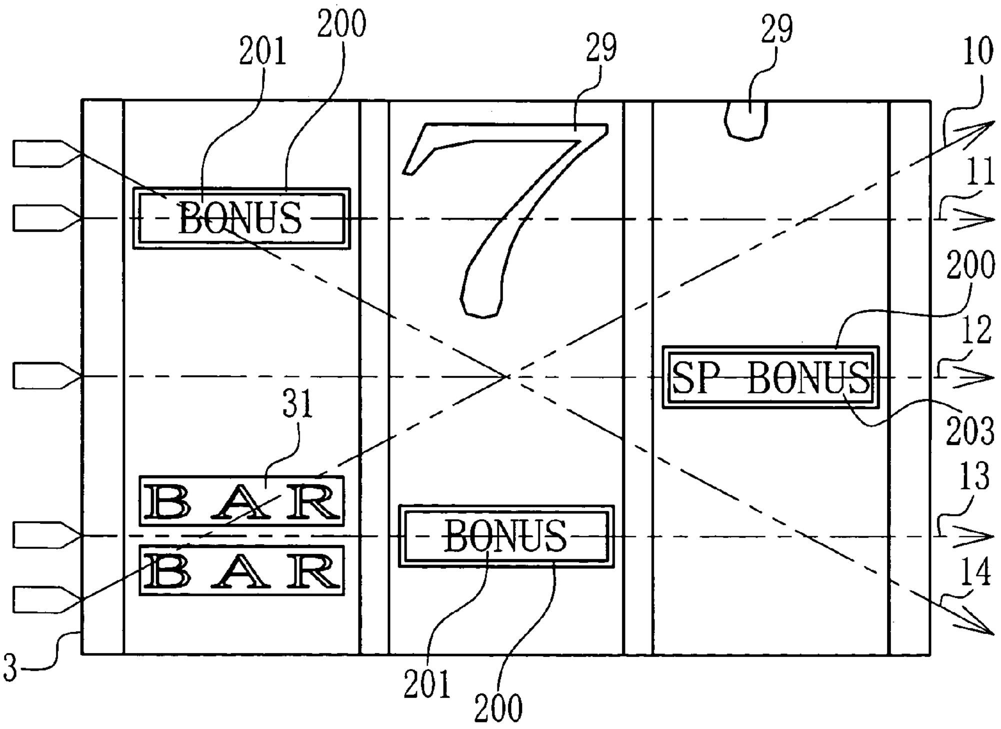
FIG. 18 is an explanatory illustration showing a state in that a changeover condition to a free game is satisfied.
Figure 19:
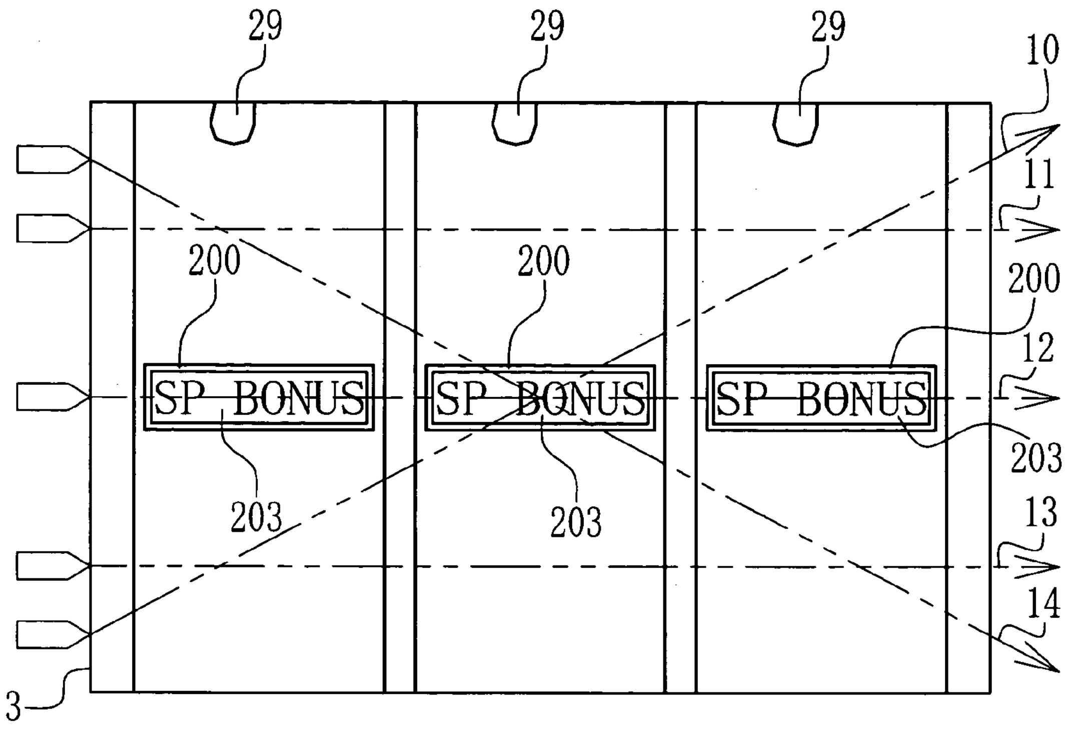
FIG. 19 is an explanatory illustration showing a state in that another changeover condition to the free game is satisfied.

The symbols of the A-zone 460 are used for determining whether a switch to a free game is made or not. The free game is a special game condition in that a game can be played without inserting the coin. When the outer reels 26 of the first to third reel assemblies 6 to 8 have stopped, the switch to the free game is made if the respective reel assemblies display the composite symbols one by one, which is formed from either of the "BONUS" symbol 201 or the "SP BONUS" symbol 203, such as shown in FIG. 18. At this time, it is possible to play the free game by seven times, for instance. Also, the switch to the free game is made if the composite symbols formed from the "SP BONUS" symbol 203 are displayed along the game line 12 such as shown in FIG. 19. In this case, it is possible to play the free game by twenty times, for instance.

Figure 20:
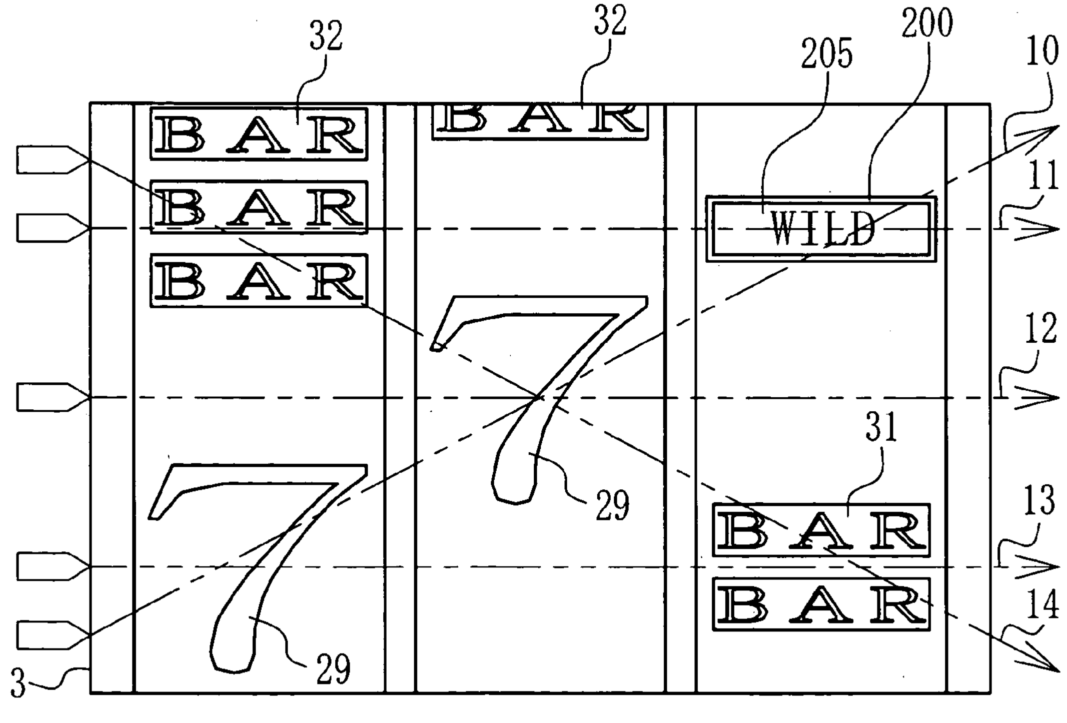
FIG. 20 is an explanatory illustration showing a state in that winning is caused by an all-around symbol.

The B-zone 470 and the C-zone 480 are used when the normal game is switched to the free game. The B-zone 470 has a size corresponding to five reference lines 35*a* to arrange the "WILD" symbols 205, the "DOUBLE" symbols 207 and the "TRIPLE" symbol 209. The "WILD" symbol 205 is an all-around symbol. The composite symbol formed from the "WILD" symbol 205 is dealt with as any symbol of the outer reel 26. For example, such as shown in FIG. 20, when a combination of the symbols displayed along the game line 10 is "7-7-WILD", the composite symbol formed from the "WILD" symbol 205 is dealt with as the "7" symbol 29 so that the winning occurs.

Also, the "DOUBLE" symbol 207 is an all-around symbol. When the winning is caused by a symbol combination including the composite symbol formed from the "DOUBLE" symbol 207, odds are doubled. Similarly, the "TRIPLE" symbol 209 is an all-around symbol for making the odds triple in a case of winning. As mentioned above, the symbols arranged in the B-zone 470 are the all-around symbols, and at the same time, have the function for increasing the odds. Thus, using the B-zone 470 brings benefits in that winning probability is raised and in that the odds are increased in case of winning.

Figure 21:
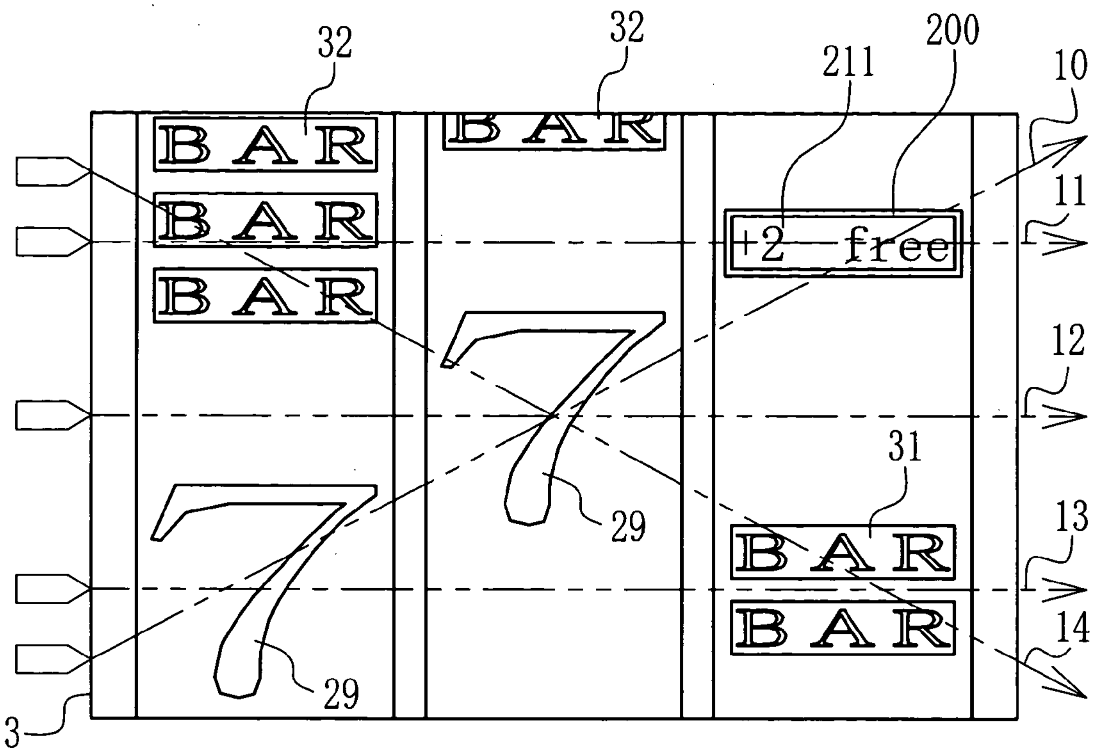
FIG. 21 is an explanatory illustration showing a symbol combination, on the basis of which the free games are added by a corresponding number.

The C-zone 480 has a size corresponding to six reference lines 35*a* to arrange the "+2 free" symbols 211, the "+3 free" symbols 213, the "+5 free" symbol 215, and the "+10 free" symbol 217. The respective symbols of the C-zone 480 are for adding a game number of the free game. When the composite symbol formed from the "+2 free" symbol 211 is displayed such as shown in FIG. 21, the game number of the free game is increased by two. Similarly, as to the "+3 free" symbol 213, the "+5 free" symbol 215 and the "+10 free" symbol 217, the game number of the free game is increased by three, five and ten respectively. In this way, using the C-zone 480 brings a benefit in that the game number of the free game is increased.

The drawing is carried out along with the game start to select either of the B-zone 470 or the C-zone 480 to be used during the free game. Since the B-zone 470 and the C-zone 480 are formed so as to be larger than a display size of the display window 3, the drawing is carried out again, after selecting the zone to be used, to determine a certain area of the selected zone to be shown through the display window 3. The second drawing is carried out with respect to each of the first to third reel assemblies. In this way, the zone to be used and the area thereof to be shown are determined so that the stop position of the inner reel 25 is determined. Then, the inner reel 25 is rotated and is stopped at the determined stop position. After that, the outer reel 26 is stopped to form the composite symbol and the above-mentioned benefits are afforded during the free game. Whenever the free game is played, the above-mentioned drawing is carried out to determine the stop position of the inner reel 25 and the sort of the benefit to be afforded in the current free game.

As described above, the normal game and the free game are provided, and the A-zone 460 to the C-zone 480 are selectively displayed in accordance with the game condition shifted from the normal game to the free game. Owing to this, the game has the variety so that it is possible to raise the interest of the player. Moreover, the B-zone 470 and the C-zone 480 are provided to afford different sorts of the benefits in the free game. The sorts of the benefits to be afforded are changed by selectively displaying the zones in the free game. Owing to this, the game has more variety so that it is possible to further raise the interest of the player.

In the above embodiment, all of the first to third reel assemblies have the same structure. However, this is not exclusive. The respective reel assemblies may have different structures. In this case, it is conceived that only the second reel assembly has the double-reel structure. Moreover, the first to third reel assemblies may employ the respective symbol sheets in which the kinds, the number and the arrangement order of the symbols are different.

It is not exclusive to simultaneously start and simultaneously stop the rotation of the respective reel assemblies, although the above embodiment does not refer to this. For example, the rotation may start from the first reel assembly in order, and may be stopped from the first reel assembly in order after a predetermined period. Further, reel stop buttons may be provided so as to correspond to the respective reel assemblies. By operating the reel stop buttons, the respective reels are stopped.

Figure 22:
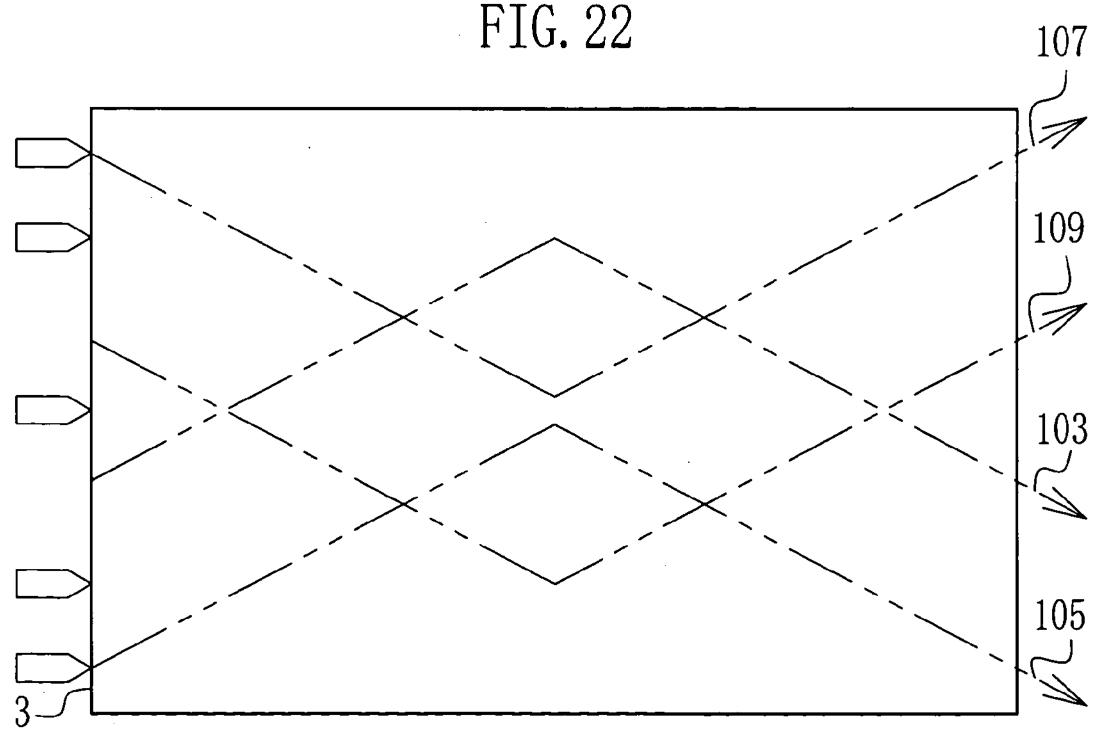
FIG. 22 is an explanatory illustration showing game lines of another embodiment.

In the above embodiment, five game lines are provided as an example. However, this is not exclusive. The number of the game lines may be less than five or may be six or more. In a case that six or more game lines are provided, it is conceived to make the number of the game lines nine by providing mountain-shaped game lines 103, 105 and valleyshaped game lines 107, 109, which are shown in FIG. 22, in addition to the five game lines used in the above embodiment.

As to the kinds of winning and the odds thereof, it is possible to freely determine them. For instance, the winning odds of the symbol combination may differ from the odds of the composite-symbol combination. It is conceived to especially raise the odds in a case that the same composite symbols are displayed along the game line.

In the above embodiment, first of all, the symbol to be stopped is determined and the stop position thereof is determined. The occurrence of winning and the kind thereof are judged on the basis of the combination of the symbols and the composite symbols, which are stopped at the determined stop positions. However, this is not exclusive. Occurrence of winning and a kind thereof may be determined first, and the inner reel and the outer reel may be stopped so as to display the combination of the symbols and the composite symbols, which are based on the determination.

Figure 23:
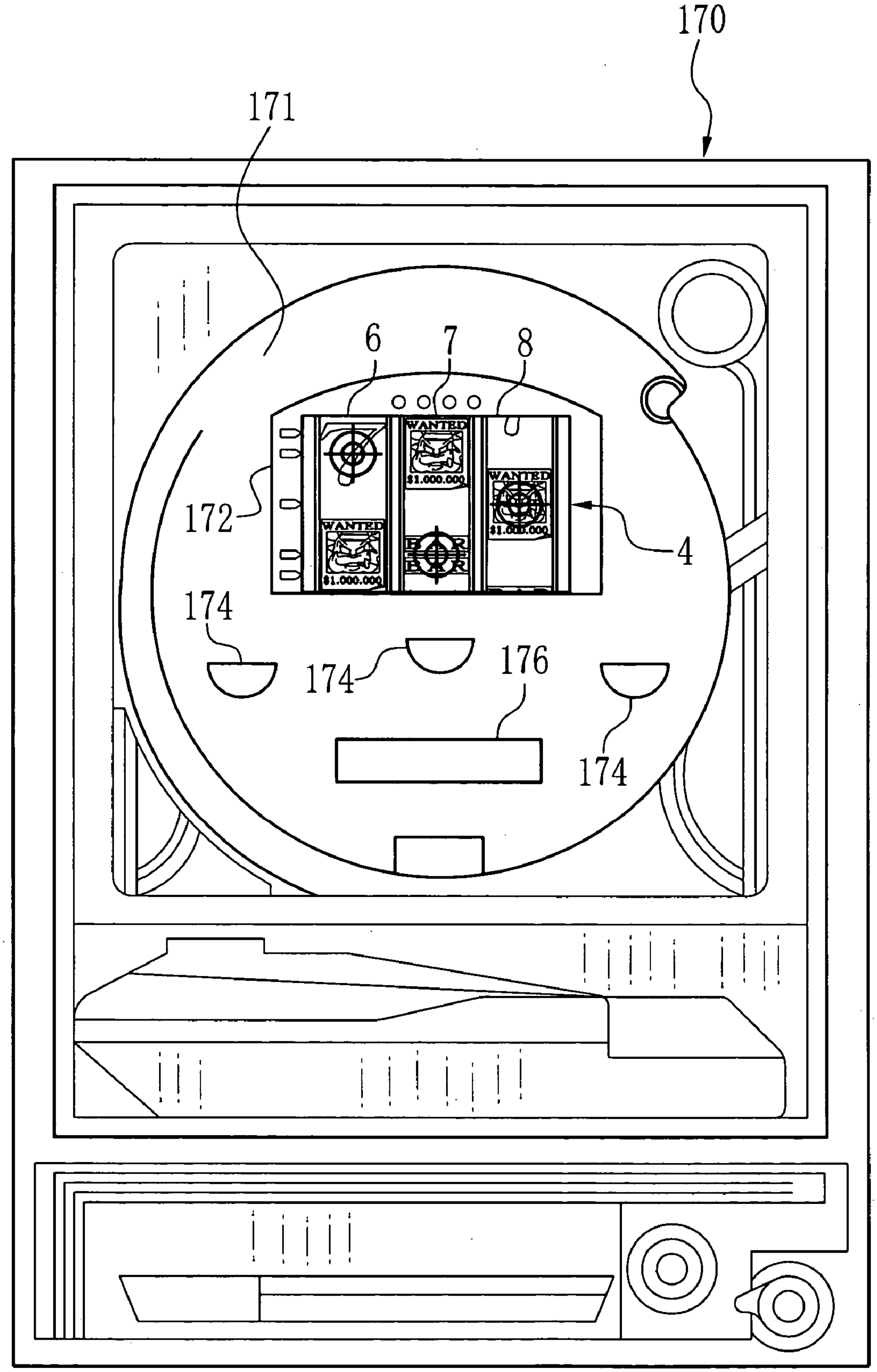
FIG. 23 is a front view of a Japanese upright pinball machine.

In the above embodiment, the slot machine is described as an example of the game machine. However, this is not exclusive. The present invention is applicable to the other game machines of Japanese upright pinball machine and so forth. As shown in FIG. 23, in a case of a Japanese upright pinball game machine 170, the symbol-displaying device 4 of the above embodiment is incorporated behind a display window 172 formed at a central portion of a game board 171.

In the pinball game machine 170, the game board 171 is provided with winning holes 174. When a game ball enters the special winning hole among the winning holes 174, the first to third reel assemblies 6 to 8 respectively comprising the inner reel and the outer reel start to rotate. And then, winning occurs in accordance with a combination of the symbols and the composite symbols when the first to third reel assemblies 6 to 8 have stopped. In a case of winning, the pinball game machine 170 is shifted from a normal game mode to a winning game mode. In the winning game mode, a winning device 176 is operated such as to be opened and closed after a prescribed period. This operation is repeated by prescribed times. The game balls enter the winning device 176 so that it is possible to obtain a large number of prize balls.

As described above, also in the case the present invention is applied to the Japanese upright pinball game machine, the game has the variety so that it is possible to raise an interest of the player.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A symbol-displaying device comprising rotatable reel assemblies, occurrence of winning being determined depending on a symbol combination shown in a display window, said symbol-displaying device including:

a double reel constituting at least one of said reel assemblies, said double reel having an inner reel and an outer reel rotating independently and coaxially;

inner symbols formed on an outer surface of said inner reel, said inner reel being observable through said outer reel;

outer symbols formed on an outer surface of said outer reel, said outer symbol constituting a composite symbol when overlapping with said inner symbol; and zones defined by imaginarily partitioning at least one of said outer surfaces of said inner and outer reels along a circumference of said inner and outer reels, only one of the zones being rotated within the display window during a determination of winning and at least one symbol of the selected zone being shown in said display window.

2. A symbol-displaying device according to claim 1, wherein at least one of said zones includes at least one game symbol concerning the winning.

3. A symbol-displaying device according to claim 2, wherein at least one of said zones includes at least one decorative symbol unrelated to the winning, said decorative symbol moving to overlap with the symbol, which constitutes the winning, when the winning has occurred.

4. A symbol-displaying device according to claim 1, wherein said zones are assigned to said outer reel and said inner symbols are arranged on said inner reel at predetermined intervals, said inner symbols concerning the occurrence of the winning.

5. A symbol-displaying device according to claim 4, wherein said zones includes at least first and second zones and said outer symbols include at least one game symbol concerning the winning and at least one decorative symbol unrelated to the winning;

said at least one game symbol is arranged in said first zone, said game symbol being translucent in order to make said inner symbol observable;

said second zone includes said at least one decorative symbol being translucent, said decorative symbol moving to overlap with said inner symbol, which constitutes the winning, when the winning has occurred.

6. A symbol-displaying device according to claim 1, wherein said game includes a normal game and a special game to be set upon completing a specific symbol combination during the normal game, prize to be awarded in said special game being different from that of said normal game and said zones including a first zone to be used in said normal game and a second zone to be used in said special game.

7. A symbol-displaying device according to claim 6, wherein said first and second zones are assigned to said inner reel.

8. A symbol-displaying device according to claim 7, wherein said outer surface of said outer reel is wrapped with an opaque sheet on which said outer symbols are formed, said outer symbols including a game symbol concerning the winning and a transparent window for constituting said composite symbol.

9. A symbol-displaying device according to claim 8, wherein said inner reel further includes a third zone to be used in said special game, and said inner symbol arranged in said third zone is for determining an additional number of said special game.

10. A symbol-displaying device according to claim 9, wherein said inner reel further includes a fourth zone to be used in said special game, and said inner symbol arranged in said fourth zone awards prize different from that awarded by said inner reel arranged in said second zone.

11. A symbol-displaying device according to claim 10, wherein said reel assemblies are said double reels.

12. The symbol-displaying device according to claim 1, wherein said zones are on said outer reel and include at least first, second and third zones, said first and second zones being translucent in order to make said inner symbol observable, said third zone including at least one mask symbol for shielding said inner symbol.

13. The symbol-displaying device according to claim 1, wherein said game includes a normal game and a special game to be played upon completing a specific symbol combination during the normal game, said zones including a first zone to be used only in said normal game and a second zone to be used only in said special game.

14. A symbol-displaying device comprising plural rotatable reel assemblies, occurrence of winning being determined depending on a symbol combination shown in a display window, said symbol-displaying device including:

a double reel constituting at least one of said reel assemblies, said double reel having an inner reel and an outer reel rotating independently and coaxially;

inner symbols formed on an outer surface of said inner reel, said inner reel being observable through said outer reel;

outer symbols formed on an outer surface of said outer reel, said outer symbol constituting a composite symbol when overlapping with said inner symbol; and zones defined by imaginarily partitioning at least one of said outer surfaces of said inner and outer reels, one of the zones being selected in each game and at least one symbol of the selected zone being shown in said display window, wherein said zones are assigned to said outer reel and said inner symbols are arranged on said inner reel at predetermined intervals, wherein said zones includes at least first and second zones, at least one game symbol is arranged in said first zone, said game symbol being translucent in order to make said inner symbol observable, said second zone includes said at least one decorative symbol being translucent, and wherein said outer reel further has a third zone including at least one mask symbol for shielding said inner symbol, said mask symbol being evacuated when shown in said display window after stopping the inner and outer reels so that the inner symbol existing under said mask symbol becomes observable.

15. A symbol-displaying device according to claim 14, wherein said first zone is used in a normal game, and said second and third zones are used in a special game to be set upon completing a specific symbol combination during said normal game, prize to be awarded in said special game being different from that of said normal game.

16. A symbol-displaying device according to claim 15, wherein said outer surface of said outer reel is wrapped with a transparent sheet carrying said game symbol, said decorative symbol and said mask symbol.

17. A symbol-displaying device comprising plural rotatable reel assemblies, an occurrence of winning being determined depending on a symbol combination shown in a display window, said symbol-displaying device including:

a double reel constituting at least one of said reel plural assemblies, said double reel having an inner reel and an outer reel rotating independently and coaxially;

inner symbols formed on an outer surface of said inner reel, said inner reel being observable through said outer reel;

outer symbols formed on an outer surface of said outer reel, said outer symbol constituting a composite symbol when overlapping with said inner symbol; and plural zones defined by imaginarily partitioning at least one of said outer surfaces of said inner and outer reels, one of the zones being selected in each game and at least one symbol of the selected zone being shown in said display window, one of the inner and outer reels being alternately rotatable forward and backward in a predefined arc that is less than a full rotation and that corresponds to the selected zone.

18. The symbol-displaying device according to claim 17, wherein said zones are on said outer reel and include at least first, second and third zones, said first and second zones being translucent in order to make said inner symbol observable, said third zone including at least one mask symbol for shielding said inner symbol.

19. The symbol-displaying device according to claim 17, wherein said game includes a normal game and a special game to be set upon completing a specific symbol combination during the normal game, a prize to be awarded in said special game being different from that of said normal game and said zones including a first zone only to be used in said normal game and a second zone only to be used in said special game.

20. The symbol-displaying device according to claim 19, wherein said first and second zones are assigned to said inner reel, and wherein said inner reel further includes a third zone to be used in said special game, and said inner symbol arranged in said third zone is for determining an additional number of said special game.

* * * * *